March 31, 1959     E. E. GILBERT ET AL     2,880,070
METHOD OF INDICATING ACIDITY AND ALKALINITY
Filed Nov. 29, 1955
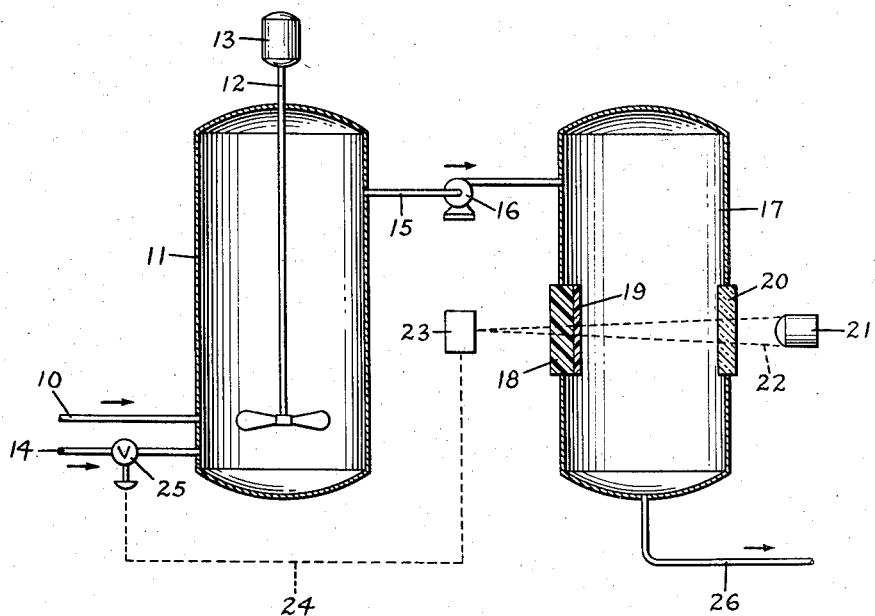
INVENTORS
EVERETT E. GILBERT
CHARLES B. MILLER
BY
ATTORNEY

2,880,070

METHOD OF INDICATING ACIDITY AND ALKALINITY

Everett E. Gilbert, Morris Township, Morris County, and Charles B. Miller, Morris Plains, N.J., assignors to Allied Chemical Corporation, a corporation of New York Application November 29, 1955, Serial No. 549,677

4 Claims. (Cl. 23—230)

This invention relates to a method of indicating the acidity or alkalinity of solutions by means of a treated polyethylene indicator.

It is an object of this invention to disclose a method of indicating the pH of a solution. It is a second object of this invention to disclose a method of control of reactions in which the measured pH is indicative of the extent of completion of the reaction. Other objects will be apparent to those skilled-in-the-art on inspection of the following description.

According to certain of its aspects this invention comprises a method of employing polyethylene, the surface of which has been ambered by contact with either (a) fluorosulfonic acid or (b) sulfur trioxide in tetrachloroethylene preferably followed by alkaline washing, to determine the acidity or alkalinity of a solution, by causing at least a portion of the solution to contact the treated polyethylene thereby changing the surface coloration of the same directly in accordance with the pH of the solution.

It will be apparent to those skilled-in-the-art that this invention may be employed in connection with many reactions in which the pH of the components can be reproducibly determined and reversibly changed by the treatment. It will be apparent that in many cases in which this invention may be employed, the desired reaction may not be carried as far as the stoichiometric end-point or alternatively in others that it may be carried beyond. In any event the end-point may have a pH above or below the neutral pH of 7 and may be approached from either side. For purpose of convenience only, the invention will be described in terms of neutralizing an acid charge such as hydrochloric acid of quality and quantity set by factors external to the immediate process under consideration, the neutralizing agent being for convenience sodium hydroxide of known concentration.

In the drawing which shows one embodiment according to which this invention may be practiced, a charge solution of hydrochloric acid of either fixed or varying quality and quantity is admitted through line 10 to vessel 11. Neutralizing solution, aqueous caustic soda for example, is admitted to vessel 11 through line 14 in quantity, controlled as hereafter indicated, and quality sufficient to neutralize the acid in line 10. Agitation by stirrer 12 and motor 13, provides for intimate mixing and the effluent removed from vessel 11 through line 15 contains solution which has been brought to the desired end-point.

Solution in line 15 is pumped by pump 16 to testing or measuring vessel 17, which map optionally be a vessel as shown or e.g. a piece of pipe or tubing having the requisites hereinafter set forth. Vessel 17 contains in one wall a window of polyethylene generally designated 18, the inner surface 19 of which has been treated at 20° C.–50° C. with either (a) fluorosulfonic acid for 60–300 seconds or (b) sulfur trioxide in tetrachloroethylene for 1–60 seconds, to obtain a surface 19 which after caustic washing is amber in color.

The surface 19 so treated is sensitive to changes in pH over a wide range and on either side of the neutral point. In acid solutions the color is greenish brown and it reversibly and reproducibly changes to a golden brown color in alkaline solutions. There is a characteristic, distinctive, reproducible color for each value of pH within the operative range. Although the surface may be employed over a wide range of pH, it is especially effective in the preferred range of operation of pH 4 to pH 9. Over a period of time no reduction in color of the surface will be noted, on either the acid or the alkaline side of its range of operation. The coloration is not removed by extended contact with a wide variety of liquids including water and neutral solvents.

Vessel 17 also may contain transparent window 20 and an adjacent source of light 21 positioned so that the rays 22 traverse window 20 and surface 19 of window 18 and then pass into photoelectric cell 23. The rays striking cell 23 have been characterized in transit through colored surface 19 so that they generate a signal in cell 23 which is directly related to and indicative of the color of surface 19, which in turn is a function of the pH of the solution in vessel 17.

The setting of cell 23 will be such as to correct for variations in the color of the solution in vessel 17, i.e. so that the signal generated in cell 23 will correspond directly and only to the color of surface 19 as indicated. The color and intensity of light rays 22 may be varied to yield the greatest signal at cell 23. Proper light filters may be inserted into the path of light rays 22 to compensate for the color of the solution, if desired.

Under normal operating conditions when the quantity and quality of solution in line 14 is adequate to neutralize the solution in line 10, the net resultant solution in vessel 17 will produce a "null-point" color in surface 19. A "null-point" signal will be generated in cell 23 and transmitted through signal line 24 to valve 25 which will be set in fixed position. When either the quality or quantity of solution in line 10 is changed, as by external uncontrollable sources, the solution admitted through line 14 will not be the proper amount to neutralize the former. Accordingly the net solution in line 15 and vessel 17 will be un-neutralized and as such it will effect an appropriate color change on surface 19 of polyethylene window 18. The light rays 22 as they pass therethrough will be adjusted in either color or intensity or both, the adjustment being reversible, reproducible, and in accordance with the variation of the solution from its "null-point" pH. A signal is generated in cell 23, as by photoelectric means, which is directly proportional to the deficiency or excess of liquid flowing through line 14, and this signal is transmitted through line 24 to valve 25 which is opened or closed the proper amount, determined by the signal, to permit passage therethrough of more or less caustic liquid to effect complete neutralization of the acid liquid in line 10.

It will be understood that proper damping mechanism, well known to those skilled-in-the-art may be inserted as in signal line 24 to eliminate undercorrection or overcorrection; and that the neutralizing and measuring, here shown separately to more clearly illustrate the invention, may be conducted in one vessel.

Typical results as obtained by the use of this invention are indicated as set forth in the following example:

Example I

A polyethylene bottle 0.5" i.d. and 3.75" long was filled at room temperature for two minutes with 100% fluorosulfonic acid, washed with water, and dried. The bottle was colored greenish-brown. Ten milliliters of 1.040 N aqueous sodium hydroxide were placed in the bottle and diluted with 50 milliliters of water. The bottle had by this time assumed a golden-brown color as a result of the alkali.

On titration with 1.040 N hydrochloric acid, a definite and clearly noticeable color change from golden-brown to greenish-brown was noted when the stoichiometric amount of acid had been added, permitting reproducible titrations of the acid with the base to pH 7.

*Example II*

The same container as noted in Example 1, was employed for the above neutralization ten times. No apparent reduction in color or in ease of observation of a color change was noted. The color and reproducibility of the treated polyethylene surface remain substantially constant indefinitely.

*Example III*

A test strip of polyethylene, which had been ambered by suspending in the vapor of 1.0% solution of sulfur trioxide in tetrachloroethylene and washing with 5% sodium hydroxide was used as test strip to neutralized a 1.040 N solution of hydrochloric acid to which a small amount of a neutral red dye had been added to color the solution. As the solution of sodium hydroxide was added and mixed, small samples were removed and placed on the test strip. After contact of the colored solution with the strip, the former was washed off to yield a strip colored, in accordance with the invention, in manner to readily indicate by comparison with a standard whether the stoichiometric amount, or more or less than that amount of sodium hydroxide, had been added. The colored solution did not tend to discolor the polyethylene surface, nor was the desired surface color removed by the washing operation.

Although the invention has been described in connection with an acid-base neutralization system, it will be apparent to those skilled-in-the-art that it is readily applicable to any systems characterized by pH changes in the operative region indicated, i.e. that the terms "acid" and "base" are to be given their broadest possible meaning in light of modern physical chemical concepts. A complementary acid-base system is one defined by a particular acid and a particular base wherein as the one is added to the other, the pH of the system approaches a neutral intermediate pH at which the stoichiometric amount of acid present is chemically equivalent to the stoichiometric amount of base present.

We claim:

1. The method of changing the pH of a solution containing a first component of a complementary acid-base system by addition thereto of controlled amounts of the second component which comprises placing in contact with said solution a solid surface of polyethylene which has been treated with a material selected from the group consisting of (a) fluorosulfonic acid and (b) sulfur trioxide in tetrachloroethylene, adding said second component to said solution, and controlling the addition of said second component in accordance with the color of said surface.

2. The method of indicating the pH of a solution which comprises placing the solution in contact with a solid surface of polyethylene which has been treated with a material selected from the group consisting of (a) fluorosulfonic acid and (b) sulfur trioxide in tetrachloroethylene for period sufficient to yield an ambered surface when washed with alkali, whereby the said surface of polyethylene assumes a color characteristic of the pH of said solution which is within the range of greenish-brown to golden-brown.

3. A method of changing the pH of a solution containing a first component of a complementary acid-base system by addition thereto of controlled amounts of the second component which comprises placing said first component in contact with a test strip of polyethylene, a solid surface of which has contacted with a material selected from a group consisting of (a) fluorosulfonic acid and (b) sulfur trioxide in tetrachloroethylene, whereby the said treated surface of polyethylene reversibly and reproducibly assumes a color which is characteristic of the pH of said solution; adding said second component to said first component thereby changing the pH of said solution whereby the said treated surface assumes a color which is characteristic of the changed pH; passing a beam of light through said treated surface; generating a signal corresponding to the light passing through said surface; and controlling the addition of said second component in accordance with said generated signal.

4. The method of measuring the pH of a solution which comprises placing the solution in contact with a test strip of polyethylene, a solid surface of which has been contacted with a material selected from the group consisting of (a) fluorosulfonic acid and (b) sulfur trioxide in tetrachloroethylene, adding to said solution a substance which changes the pH thereof, passing a beam of light through said solution, said surface and onto a photoelectric cell, and controlling the addition of said substance in response to changes in the light falling upon said photoelectric cell.

References Cited in the file of this patent

UNITED STATES PATENTS

| | | |
|---|---|---|
| 2,077,211 | Buckley | Apr. 13, 1937 |
| 2,567,445 | Parker | Sept. 11, 1951 |
| 2,601,840 | Smith et al. | July 1, 1952 |
| 2,632,045 | Sziklai | Mar. 17, 1953 |